United States Patent [19]

Hanai

[11] Patent Number: 4,844,546
[45] Date of Patent: Jul. 4, 1989

[54] SEAT WITH ARM REST

[75] Inventor: Toshimichi Hanai, Yokosuka, Japan

[73] Assignee: Nissan Motor Company, Ltd., Japan

[21] Appl. No.: 169,064

[22] Filed: Mar. 17, 1988

[30] Foreign Application Priority Data

Mar. 31, 1987 [JP] Japan .............................. 62-48178[U]

[51] Int. Cl.$^4$ ............................................. A47C 7/54
[52] U.S. Cl. ................................. 297/416; 297/452; 297/218; 297/228
[58] Field of Search .............. 297/218, 219, 229, 225, 297/227, 228, 416

[56] References Cited

U.S. PATENT DOCUMENTS

| | | | |
|---|---|---|---|
| 2,334,966 | 11/1943 | Thompson | 297/218 |
| 2,751,971 | 6/1956 | Gentsch | 297/416 |
| 3,104,913 | 9/1963 | Faulkner et al. | 297/218 |
| 3,170,729 | 2/1965 | Grant | 297/416 |
| 3,233,253 | 2/1966 | Cauvin | 297/218 |
| 3,341,251 | 9/1967 | Costin | 297/452 |
| 3,664,156 | 10/1971 | Servas | 297/416 |
| 3,842,456 | 10/1974 | Bronstien | 297/418 |
| 3,928,898 | 12/1975 | Smoot | 297/218 |
| 4,022,502 | 5/1977 | Smith et al. | 297/416 |

Primary Examiner—Francis K. Zugel
Attorney, Agent, or Firm—Lowe, Price, Leblanc, Becker & Shur

[57] ABSTRACT

A seat with an arm rest is disclosed, which comprises a first structure constituting a structural base of a seat cushion part; a second structure constituting a structural base of a seat back part; a third structure constituting a structural base of an arm rest and detachably connected to the first structure; and a single cover member covering the first, second and third structures, the cover member having a peripheral edge which is detachably fastened to a given portion of the third structure latched to a holding structure attached to the first structure.

14 Claims, 4 Drawing Sheets

SEAT WITH ARM REST

BACKGROUND OF THE INVENTION

1. Field of the Invention

The present invention relates in general to seats for automobiles, and more particularly to the automotive seats of a type equipped with one or more arm rests.

2. Description of the Prior Art

Japanese Utility Model First Provisional Publication No. 58-80059 shows one conventional automotive seat assembly equipped with an arm rest. As is shown in FIG. 8 of the accompanying drawings, the conventional seat assembly 100 disclosed in this reference comprises generally a seat 102, a seat sliding device 104 and an arm rest device 106. The seat assembly 100 illustrated is arranged beside another seat assembly 108 with the arm rest device 106 located therebetween.

The seat 102 includes a seat cushion 102a and a seat back 102b which is pivotally mounted to the seat cushion 102a through a known inclining mechanism (not shown). Designated by numeral 102c is a base frame of the seat cushion 102a.

The seat sliding device 104 comprises parallel stationary rails 104a (only one is shown) mounted on a vehicle floor (no numeral), parallel movable rails 104b (only one is shown) axially movably disposed on the stationary rails 104a, and a known latch mechanism (not shown) for latching the movable rails 104b at a desired position relative to the stationary rails 104a. The movable rails 104b are connected to the base frame 102c of the seat cushion 102a through brackets 110 (only one is shown).

The arm rest device 106 comprises front and rear links 106a (only one is shown) which are pivotally connected at their lower ends to front and rear portions of the movable rail 104b. An arm rest proper 106b is pivotally connected at its front and rear portions to the upper portions of the front and rear links 106a, so that the arm rest proper 106b is swingably movable between a raised operative position as illustrated by a solid line and a lowered inoperative position as illustrated by a broken line. Suitable stoppers are fixed to the bracket 110 to assure positioning of the arm rest proper 106b at the raised and lowered positions.

However, the seat assembly 100 described hereinabove has a drawback in that when the arm rest proper 106b is lifted up to its raised operative position, the front and rear links 106a become visible or exposed through a clearance between the seat cushion 102a and the arm rest proper 106b, thereby spoiling the external appearance of the seat assembly 100. Furthermore, the pivotal movement of the arm rest device 106 has the potential for pinching the seat occupant's finger or fingers in the pivotal links 106a.

SUMMARY OF THE INVENTION

It is, therefore, an object of the present invention to provide a seat having an arm rest portion, which has an excellent external appearance and is free of the above-mentioned drawbacks.

According to the present invention, there is provided a seat having an arm rest portion which is easily dismantled when not needed.

According to the present invention, there is provided a seat which comprises a first structure constituting a structural base of a seat cushion part of the seat; a second structure constituting a structural base of a seat back part of the seat; a third structure constituting a structural base of an arm rest device, comprising a holding structure secured to said first structure and latching means for detachably latching said third structure to said holding structure when said third structure is properly held by said holding structure, wherein said holding structure comprises a metallic stay member of generally L-shaped cross section, said stay member being secured at a first wing part thereof to a bottom part of said first structure having a second wing part raised upward and a resilient metal plate secured at its lower end to said first wing part of said stay member in a manner such as to leave a restricted given clearance between the metal resilient plate and the second wing part of said stay member, said given clearance being so sized as to neatly receive a part of said third structure; first means for detachably connecting said third structure to said first structure; a single cover member covering said first, second and third structures; second means for detachably fastening a peripheral edge of said cover member to a given portion of said third structure; and an arm rest pad which is put on said third structure and covered with said cover member; first means for detachably connecting the third structure to the first structure; a single cover member covering the first, second and third structures; and second means for detachably fastening a peripheral edge of the cover member to a given portion of the third structure.

DETAILED DESCRIPTION OF THE PREFERRED EMBODIMENT

Figure 1:
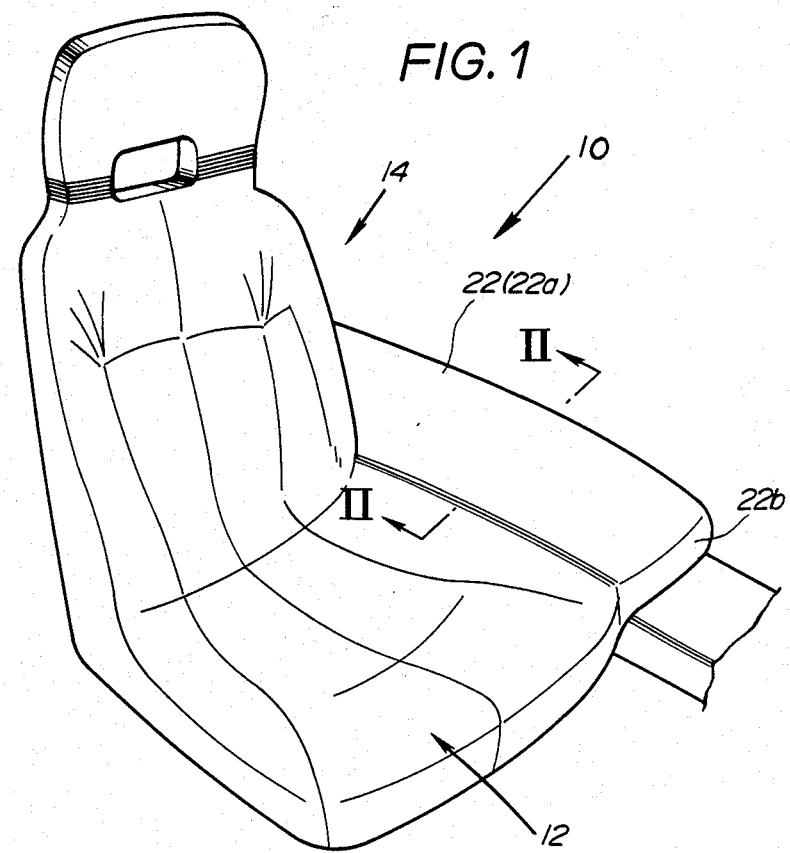
FIG. 1 is a perspective view of a seat according to the present invention.

Referring to FIGS. 1 to 6, particularly FIG. 1, there is shown a seat 10 according to a preferred embodiment of the present invention. The seat 10 shown is designed as a front right seat of a motor vehicle.

The seat 10 comprises a seat cushion part 12 and a seat back part 14. A known reclining device is mounted within the seat 10 to achieve a reclining movement of the back rest part 14.

Figure 2:
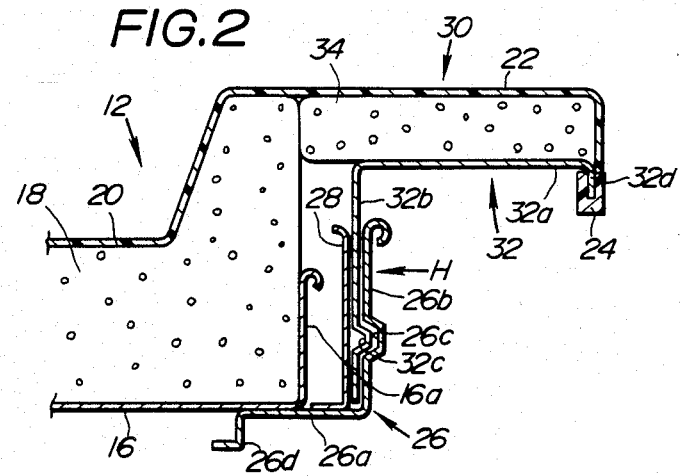
FIG. 2 is a sectional view taken along the line II—II of FIG. 1.

As is best seen in FIG. 2 (which is the sectional view taken along the line II—II of FIG. 1), the seat cushion part 12 comprises a generally rectangular seat cushion frame 16 and a seat cushion pad 18 mounted on the frame 16. The seat cushion frame 16 has a raised part 16a to which a side lower part of the pad 18 abuts. The upper portion of the raised part 16a is curled outwardly.

The seat cushion pad 18 is covered with an outer cover member 20.

The cover member 20 has an extension part 22 integral therewith. An elongate hook 24 is fixed to an outward straight periphery of the extension part 22 in a manner to extend along the same.

As is also best seen in FIG. 2, a metallic stay member 26 of generally L-shaped cross section is secured to the seat cushion frame 16. This stay member 26 comprises a horizontal lower part 26a and a vertical upper part 26b. The horizontal part 26a is secured to a bottom portion of the seat cushion frame 16, leaving a given space between the raised part 16a of the seat cushion frame 16 and the vertical part 26b of the stay member 26. It is to be noted that the vertical part 26b extends substantially in parallel with the longitudinal axis of the seat 10. The vertical part 26b is formed with an elongate groove 26c which faces toward the raised part 16a of the seat cushion frame 16 and extends along the axis of the seat 10. The horizontal part 26a of the metallic stay member 26 is formed with a stepped portion 26d which is shaped to catch the elongate hook 24 for a purpose clarified hereinafter.

A resilient metal plate 28 is secured to the horizontal part 26a of the stay member 26 in such a manner that a flat major section thereof faces the vertical part 26b of the stay member 26 with a restricted clearance left therebetween. The resilient plate 28 and the vertical part 26b of the stay member 26 thus constitute a so-called "base member holder" H for a purpose described hereinbelow.

Detachably caught by the base member holder H is a metallic structural base member 32 of an arm rest device 30 which is to be arranged beside the seat cushion part 12 upon assembly. The base member 32 has a generally L-shaped cross section, comprising a horizontal upper part 32a and a vertical lower part 32b. The vertical part 32b is formed with an elongate ridge portion 32c which extends along the longitudinal axis of the vertical part 32b, and the horizontal part 32a is bent downward at its leading end thereby to constitute a catch portion 32d for the elongate hook 24.

As is best understood with reference to FIG. 2, upon assembly, the elongate ridge portion 32c of the vertical part 32b is detachably engaged with the groove 26c of the vertical part 32b of the base member 32. Upper ends of the resilient plate 28 and the vertical part 26b of the stay member 26 are curled outward for facilitating insertion of the vertical part 32b of the base member 32.

An arm rest pad 24 is put on the horizontal upper part 32a of the base member 32 having one side in contact with the seat cushion part 18. The extension part 22 of the cover member 20 covers the arm rest pad 34 and is attached thereto by having the hook 24 engaged with the catch portion 32d of the base member 32.

Preferably, the cover member 20 is made of moquette or any known material which has a considerable elasticity. As is seen from FIGS. 3 and 4, the cover member 20 is constructed by stitching several parts which have been thermoformed. As is seen from FIG. 3, the stitched portions of the cover member 20 constitute a contour of the seat 10 assembled. V-shaped cuts 36 are formed at given portions of the cover member 20 where a sharp curving is necessitated. When the cover member 20 is properly put on the unit comprising the seat cushion pad 18 and the seat back pad (not shown), given portions of the cover member 20, indicated by references "a", "b" and "c", are bonded to the pads for assuring intimate connection between the cover member 20 and the pads.

Figure 3:
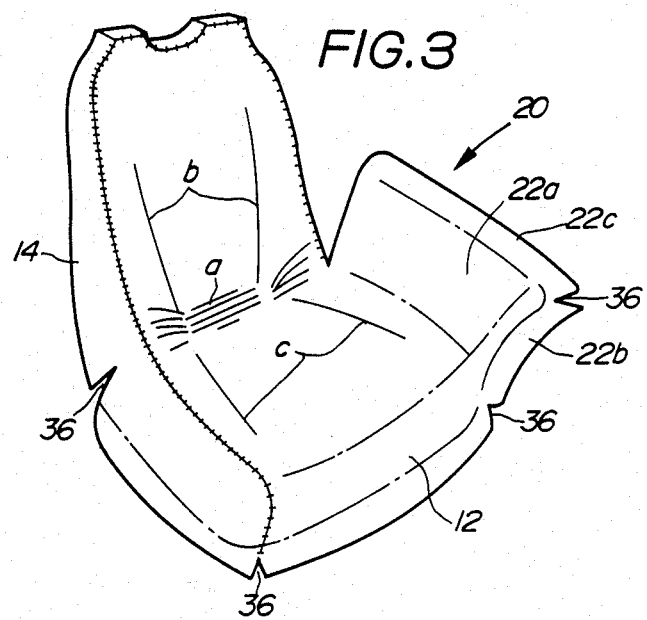
FIG. 3 is a perspective view of an outer cover member of the seat of the present invention.
Figure 4:
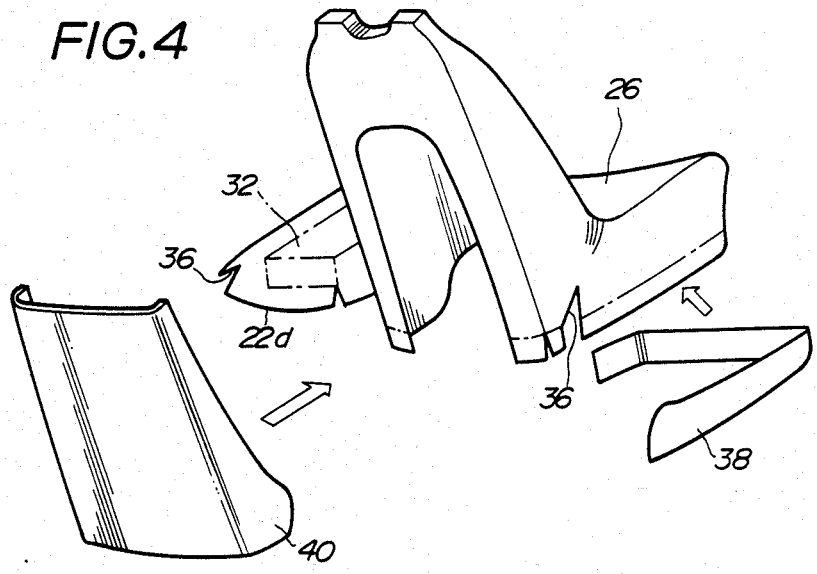
FIG. 4 is an exploded view of constructional parts of the seat of the present invention.

As is best seen in FIGS. 3 and 4, the extension part 22 of the cover member 20 comprises a major portion 22a and three side portions 22b, 22c and 22d which are stitched to form a shollow bag structure. As best understood with reference to FIGS. 1 and 2, upon assembly, the bag structure 22 of the cover member 20 neatly puts therein the arm rest pad 34 which is located on the base member 32 held by the holder H.

The following steps are taken for assembling the arm rest device 30.

Figure 5:
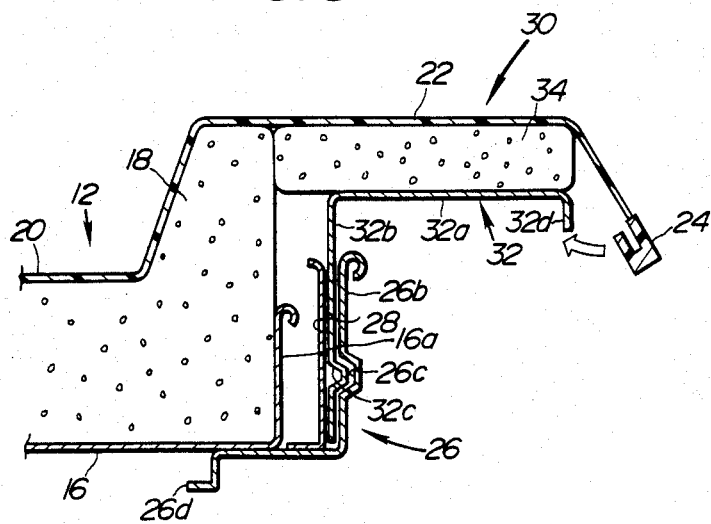
FIG. 5 is a sectional view of an essential part of the seat of the present invention, showing a condition wherein an arm rest is installed in position for use.

First, the base member 32 is held by the base member holder H (see FIG. 2) and the arm rest pad 34 is put on the base member 32 properly. Thereafter, the bag-shaped extension part 22 of the cover member 20 is extended to cover the pad 34 and, as is best seen in FIG. 5, the hook 24 is fastened to the catch portion 32d of the base member 32. The arm rest device 30 thereupon assumes its assembled condition concealing the unsightly interior parts, such as the parts 16a, 28 and 32, by the extension part 22 of the cover member 20. Because the interior parts of both the seat cushion and the arm rest device are wholly covered with the integrally formed cover member 20, the external appearance of the seat is not spoiled even though the arm rest is being utilized.

Figure 6:
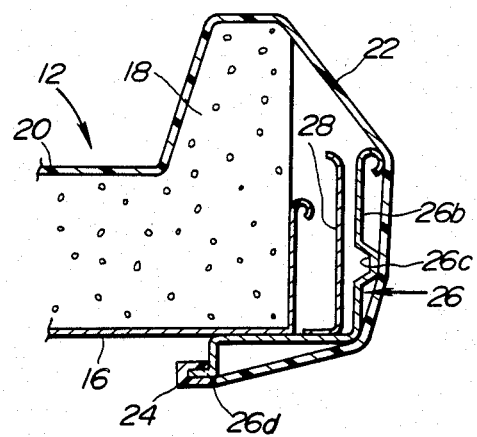
FIG. 6 is a view similar to FIG. 5, but showing a condition wherein the arm rest is not installed.

For dismantling the arm rest device 30, reversed steps are taken. That is, the pad 34 and the base member 32 are dismantled from their set positions, and finally, as is best seen in FIG. 6, the elongate hook 24 is fastened to the catch portion 26d of the stay member 26. Under this dismantled condition, the unsightly interior parts 16a, 28 and 26 are concealed by the extension part 22 of the cover member 20.

Figure 7:
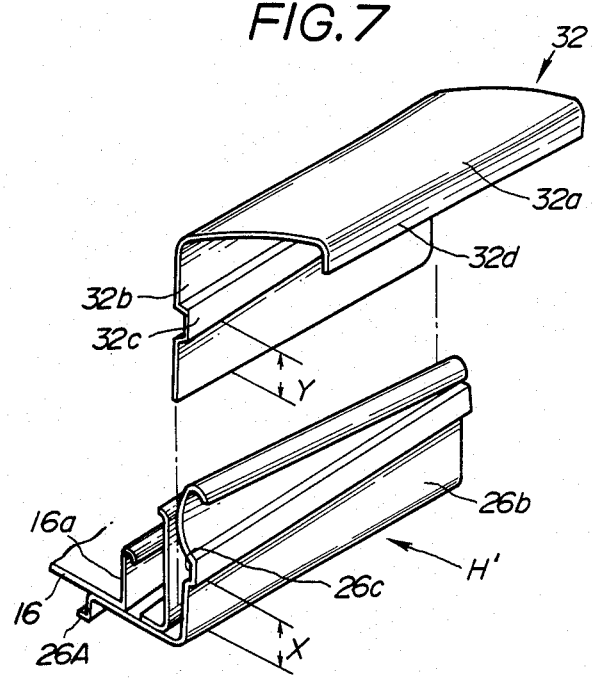
FIG. 7 is a perspective view of a modification of the essential part of the seat according to the present invention.
Figure 8:
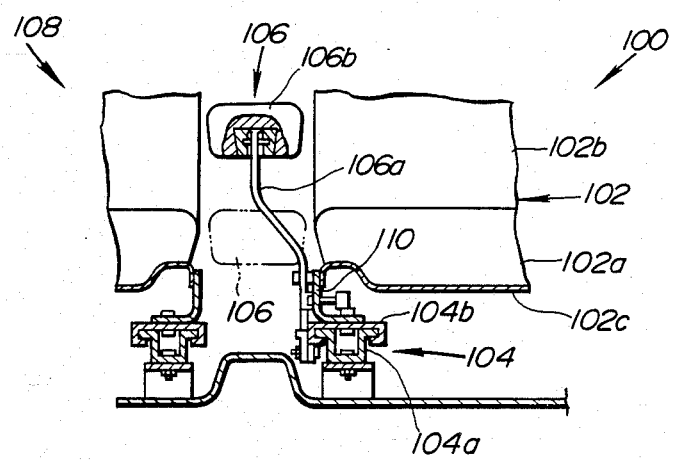
FIG. 8 is a sectional but partial view of a conventional automotive seat equipped with an arm rest.

Referring to FIG. 7, there are shown essential parts of a modification of the arm rest device. In this modification, the elongate groove 26c extends obliquely. That is, the distance "X" between the groove 26c and the lower edge of the vertical part 26b is gradually increased with increase of distance from the front end of the vertical part 26b. Similar to this, the elongate ridge portion 32c of the base member 32 extends obliquely, increasing the distance "Y" between the ridge portion 32c and the lower edge of the vertical part 32b of the base member 32 with increase of distance from the front end of the vertical plate 32b.

With these oblique arrangement of the groove 26c and the ridge portion 32c, the positioning of the base member 32 relative to the stay member 26 is assured.

Following modifications are also available in the present invention.

If desired, the arm rest pad 34 of the arm rest device 30 may be removed. In this case, the base member 32 is enlarged in size to neatly support thereon the bag-shaped extension part 22 of the cover member 20.

Furthermore, as a substitute for the arm rest pad 34, a tool box, taperecorder cassette deck, compact disc player, automobile telephone or the like may be put on the base member 32. Manipulation of such an optional item is carried out with the extension part 22 turned over.

What is claimed is:

1. A seat, comprising:
   a first structure constituting a structural base of a seat cushion part of the seat;
   a second structure constituting a structural base of a seat back part of the seat;

a third structure constituting a structural base of an arm rest device, comprising a holding structure secured to said first structure and latching means for detachably latching said third structure to said holding structure when said third structure is properly held by said holding structure, wherein said holding structure comprises a metallic stay member of generally L-shaped cross section, said stay member being secured at a first wing part thereof to a bottom part of said first structure and having a second wing part raised upward and a resilient metal plate secured at its lower end to said first wing part of said stay member in such a manner as to leave a restricted predetermined clearance between the metal plate and the second wing part of said stay member said predetermined clearance being sized so as to neatly receive a part of said third structure;

first means for detachably connecting said third structure to said first structure;

a single cover member covering said first, second and third structures;

second means for detachably fastening a peripheral edge of said cover member to a selected portion of said third structure; and an arm rest pad which is put on said third structure and covered with said cover member.

2. A seat as claimed in claim 1, in which said latching means comprises:

means defining an elongate groove on the other wing part of said stay member; and means defining an elongate ridge on the part of said third structure, said elongate ridge being latchingly engaged with said elongate groove when said third structure is properly held by said holding structure.

3. A seat as claimed in claim 2, in which said elongate groove extends obliquely with respect to a longitudinal axis of the other wing part of said stay member, and in which said elongate ridge extends obliquely with respect to a longitudinal axis of the part of said third structure.

4. A seat as claimed in claim 2, in which respective upper ends of the other wing part of said stay member and said resilient metal plate are curled outward in order to facilitate insertion of said part of said third structure into said restricted given clearance.

5. A seat as claimed in claim 1, in which said second means comprises:

a hook fixed to said peripheral edge of said cover member; and a projected catch portion integrally formed on a given part of said third structure, said catch portion being shaped to detachably catch said hook.

6. A seat as claimed in claim 4, further comprising another projected catch portion which is integrally formed on the other wing part of said stay member, said catch portion being shaped to detachably catch said hook.

7. A seat as claimed in claim 1, in which said cover member is bonded to said first and second structures at predetermined portions.

8. A seat as claimed in claim 1, in which said second structure is pivotally connected to said first structure.

9. A seat comprising:

a first structure constituting a structural base of a seat cushion part of the seat;

a second structure constituting a structural base of a seat back part of the seat;

a third structure constituting a structural base of a certain device other than said seat cushion part of said seat back part;

first means including a holding structure secured to said first structure and latching means for detachably latching said third structure to said holding structure, said holding structure including a stay member of generally L-shaped cross section which is secured at a first wing part thereof to a bottom part of said first structure having a second wing part raised upward, and a resilient plate secured at a lower end to said first wing part of said stay member in a manner such as to leave a restricted predetermined clearance between the resilient plate and the second wing part of said stay member, said predetermined clearance being sized so as to stably hold a part of said third structure;

a single cover member covering said first, second and third structures; and second means for detachably fastening a peripheral edge of said cover member to either one of a selected portion of said third structure and a selected portion of said holding structure.

10. A seat as claimed in claim 9, wherein:

said latching means comprises means defining an elongate groove on the second wing part of said stay member; and means defining an elongate ridge on the part of said third structure, said elongate ridge being latchingly engaged with said elongate groove when said third structure is properly held by said holding structure.

11. A seat as claimed in claim 10, wherein:

said elongate groove extends obliquely with respect to a longitudinal axis of the second wing part of said stay member, and in which said elongate ridge extends obliquely with respect to a longitudinal axis of said part of said third structure.

12. A seat as claimed in claim 10, wherein:

respective upper ends of the second wing part of said stay member and said resilient plate are curled outward in order to facilitate insertion of said part of said third structure into said restricted predetermined clearance.

13. A seat as claimed in claim 9, wherein:

said second means comprises a hook fixed to said peripheral edge of said cover member; and a projected catch portion integrally formed on a given part of said third structure, said catch portion being shaped to detachably catch said hook.

14. A seat as claimed in claim 13, further comprising:

another projected catch portion which is integrally formed on the other wing part of said stay member, said catch portion being shaped to detachably catch said hook.

* * * * *